(12) United States Patent
Harel

(10) Patent No.: US 9,006,999 B2
(45) Date of Patent: Apr. 14, 2015

(54) FLICKERING SUPPRESSOR SYSTEM FOR A DIMMABLE LED LIGHT BULB

(75) Inventor: Jean Claude Harel, San Jose, CA (US)

(73) Assignee: Renesas Electronics America Inc., Santa Clara, CA (US)

( * ) Notice: Subject to any disclaimer, the term of this patent is extended or adjusted under 35 U.S.C. 154(b) by 220 days.

(21) Appl. No.: 13/598,737

(22) Filed: Aug. 30, 2012

(65) Prior Publication Data

US 2013/0057169 A1 Mar. 7, 2013

Related U.S. Application Data

(60) Provisional application No. 61/530,185, filed on Sep. 1, 2011.

(51) Int. Cl.
*H05B 37/02* (2006.01)
*H05B 33/08* (2006.01)

(52) U.S. Cl.
CPC ........... *H05B 33/0815* (2013.01); *Y02B 20/346* (2013.01)

(58) Field of Classification Search
USPC ...... 315/209 R, 224–226, 291, 307, 308, 312
See application file for complete search history.

(56) References Cited

U.S. PATENT DOCUMENTS

| | | | |
|---|---|---|---|
| 6,175,195 B1 | 1/2001 | Janczak et al. | 315/194 |
| 7,038,399 B2 | 5/2006 | Lys et al. | 315/291 |
| 7,656,103 B2 * | 2/2010 | Shteynberg et al. | 315/312 |
| 2008/0258647 A1 | 10/2008 | Scianna | 315/291 |

* cited by examiner

*Primary Examiner* — Jimmy Vu
(74) *Attorney, Agent, or Firm* — Campbell Stephenson LLP

(57) ABSTRACT

A flicker suppression system for a dimmable LED bulb. In one embodiment, the system includes a rectifier circuit having input terminals and output terminals. The rectifier circuit is configured to rectify a line voltage to generate a rectified voltage at its output terminals. A resistor and switch are also included and coupled in series. A switch control circuit is directly coupled between the output terminals and configured to control the switch only as a function of the rectified voltage.

13 Claims, 3 Drawing Sheets

US 9,006,999 B2

FLICKERING SUPPRESSOR SYSTEM FOR A DIMMABLE LED LIGHT BULB

RELATED APPLICATIONS

This application claims the domestic benefit under Title 35 of the United States Code §119(e) of U.S. Provisional Patent Application Ser. No. 61/530,185, entitled "Flickering Suppressor System for LED Light Bulb TRIAC Dimmable," filed Sep. 1, 2011, and naming Jean Claude Harel as the inventor, which is hereby incorporated by reference in its entirety and for all purposes as if completely and fully set forth herein.

BACKGROUND OF THE INVENTION

Dimmers are devices that allow users to adjust the amount of power delivered to light bulbs in various lighting applications (e.g., home, commercial, etc.). Many types of conventional dimmers are often mounted on a wall and have a user interface such as a knob or a slider, which can be manipulated by a user. Typically, the user interface is mechanically coupled to a variable resistor, and as a user manipulates the user interface the resistance of the variable resistor increases or decreases, which in turn increases or decreases the power delivered to the light bulb.

SUMMARY OF THE INVENTION

A flicker suppression system for a dimmable LED bulb. In one embodiment, the system includes a rectifier circuit having input terminals and output terminals. The rectifier circuit is configured to rectify a line voltage to generate a rectified voltage at its output terminals. A resistor and switch are also included and coupled in series. A switch control circuit is directly coupled between the output terminals and configured to control the switch only as a function of the rectified voltage.

BRIEF DESCRIPTION OF THE DRAWINGS

The present invention may be better understood in its numerous objects, features, and advantages made apparent to those skilled in the art by referencing the accompanying drawings.

The use of the same reference symbols in different drawings indicates similar or identical items.

DETAILED DESCRIPTION

Many lighting systems are powered by an alternating current (AC) source, commonly referred to as "line voltage" (e.g., 120 volts RMS at 60 hertz). A conventional AC dimmer typically receives line voltage as an input, and provides an adjusted output voltage for a light bulb.

Conventional dimmers can control power delivered to a light bulb in different ways. Most commonly, adjustments by the user causes the dimmer to adjust the duty cycle of the output (e.g., by chopping out portions of the AC voltage cycles). This technique is sometimes referred to as phase angle control. The most commonly used dimmers of this type employ a triode-for-alternating current (TRIAC), which is an electronic component that can conduct current in either direction when it is triggered (turned on). When employed in a dimmer, the TRIAC chops off rising portions of the AC voltage half cycles (e.g., portions after 0 volt crossings and before peaks) depending on where the user interface (e.g., slider or knob) is set as will be more fully described below.

Figure 1:
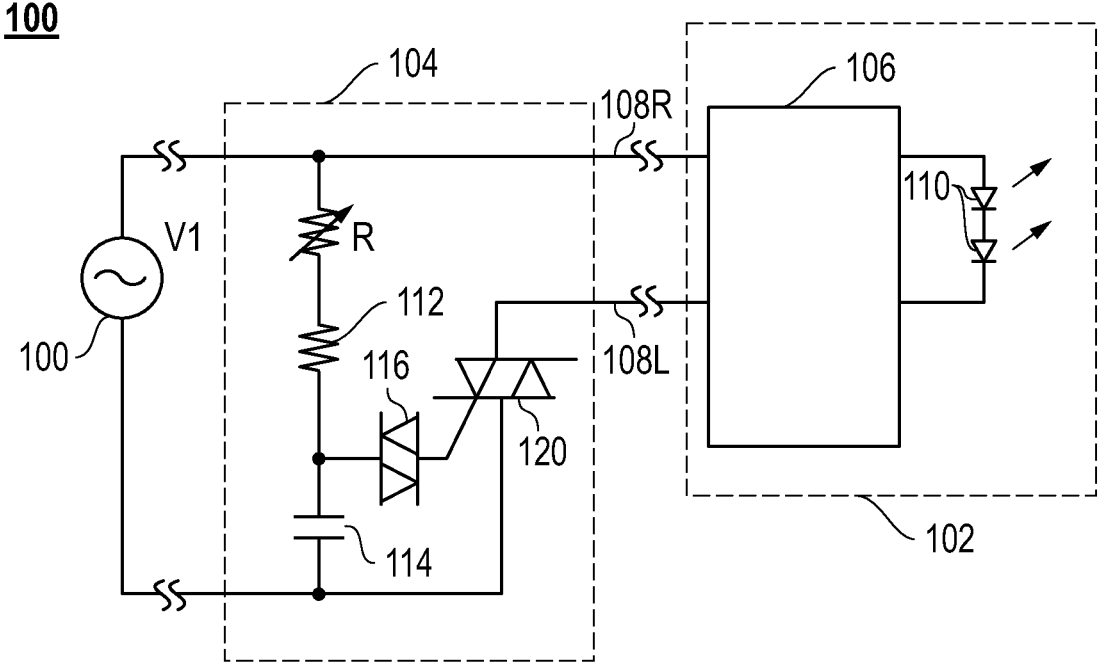
FIG. 1 is a schematic and block diagram illustrating an example lighting system.

FIG. 1 illustrates a lighting system that employs a TRIAC-based dimmer. The lighting system includes voltage source 100 that delivers a line voltage V1 to TRIAC-based dimmer 104, which in turn controls the power delivered to light bulb 102. Dimmer 104 is one example of one of many types of dimmers that can be employed for controlling power to a light bulb, such as light bulb 102 shown in FIG. 1. It should be noted that the term dimmer should not be limited to dimmer 104 shown within FIG. 1.

Dimmer 104 includes a variable resistor R, the resistance of which can be varied by a user via an interface (not shown) such as a wall-mounted slider. Variable resistor R is coupled in series to resistor 112, the combination of which is coupled to capacitor 114. A diode-for-alternating current (DIAC) 116 is coupled between a capacitor 114 and a gate of TRIAC 120. Light bulb 102 is connected in series with TRIAC 120.

A DIAC is a diode that activates or turns-on only after its breakover voltage has been reached. When this occurs, there is a decrease in the voltage drop across the diode and, usually, a sharp increase in current through the diode. The diode remains active or "on" until the current through it drops below a value characteristic for the device, called the DIAC holding current. Below this value, the diode switches back to its high-resistance (non-conducting) off state. DIACs are mainly used for triggering (turning on) TRIACs. TRIACs can be triggered by either a positive or a negative current applied to its gate electrode. However, a minimum amount of current (latching current) is required to maintain the TRIAC in the on-state immediately after a TRIAC is triggered. Moreover, a minimum current (holding current) is required to maintain the TRIAC in the on-state, not allowing it to turn off.

Typical TRIAC-based dimmers can dim light through phase angle control as mentioned above. Initially, assume TRIAC 120 is turned off so that no power flows to light bulb 102. As line voltage V1 increases from zero (at the start of every half wave), capacitor 114 charges. When the voltage on capacitor 114 exceeds the breakover voltage of DIAC 116, DIAC 116 activates and conducts current from capacitor 114 to the gate of TRIAC 120 and turns it on. The DIAC 116 is active for a short period of time while discharging capacitor 114. Eventually the voltage across DIAC 116 drops and it deactivates, which terminates the gate current to TRIAC 120. If current flowing through TRIAC 120 exceeds its latching current when the gate current terminates, the TRIAC will remain on and continue to conduct current to light bulb 102 so long as the TRIAC's holding current is exceeded. The current to light bulb 102 will eventually fall below the TRIAC's holding current as the line voltage V1 drops to zero near the end of the half cycle, at which point TRIAC 120 will turn off. A similar process repeats for the next half cycle.

Figure 2:
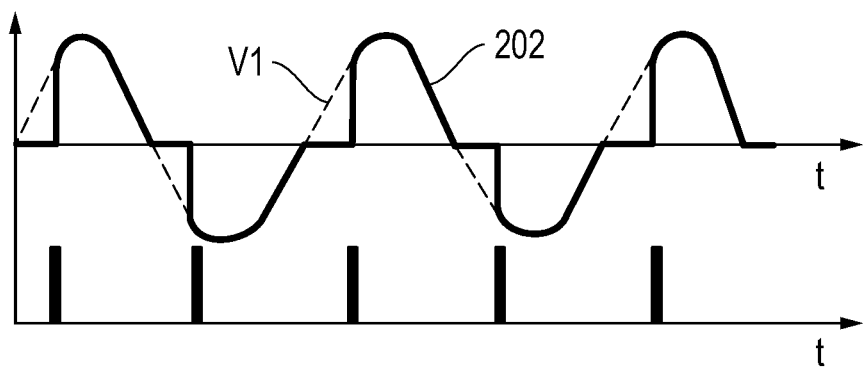
FIG. 2 illustrates waveforms relevant to the operation of the lighting system shown in FIG. 1.

FIG. 2 illustrates wave forms relevant to the operation of dimmer 104. In particular, FIG. 2 shows the line voltage V1, and the chopped output voltage 202 provided to light bulb 102 as TRIAC 120 turns on and off as described above. FIG. 2 also shows pulses during which DIAC is activated and conducting current to the gate of TRIAC 120. TRIAC 120 turns on with each pulse of DIAC 116 as described above. A time constant is formed by capacitor 114 and the series combination of variable resistor R and resistor 112. The time at which the DIAC pulses occur depends on the time constant, which can be adjusted by changing the resistance of variable resistor R. One of ordinary skill in the art understands that the input wave form can be clipped at different phase angles than that shown within FIG. 2 by adjusting the resistance of variable resistor R.

Light emitting diode (LED) based light bulbs are becoming more popular due to their long service life and high energy efficiency. LED light bulbs can be made interchangeable with other types of light bulbs such as incandescent light bulbs. Some LED light bulbs are made with identical bases so that they are directly interchangeable with incandescent light bulbs.

LEDs operate based on substantially DC power sources. In other words, LEDs need to be powered in constant current/ constant voltage mode. In FIG. 1, light bulb 102 takes form in an LED light bulb that includes a LED converter circuit 106 and LEDs 110. The LED converter 106 is configured to receive the chopped AC output of dimmer 104 and provide constant current and voltage to the LED 110. In one embodiment, the LED controller 106 may include a rectifier, a low pass filter, and a DC converter (not shown). In this embodiment, the output of the DC converter tries to provide a stable DC voltage to LED 110s as duty cycle changes for the output voltage provided by dimmer 104. Reducing the duty cycle of the voltage may not achieve light dimming since the LED controller 106 tries to adjust for the missing portion of the input voltage. If dimmer 104 outputs a voltage having a duty cycle of 50% "on" or if dimmer 104 outputs a voltage having a duty cycle of 25% "on" the difference in light output by light bulb 102 may not be perceivable by the human eye. In other words, a user may not notice a perceptible difference in the light output as the user adjusts down the variable resistor R due to the action of the DC converter until under-voltage circuitry (not shown) of controller 106 kicks in, at which point the LED converter 106 turns off and no light is generated by LEDs 110 at all.

To resolve this problem, the LED controller 106 may include a circuit (e.g., a microcontroller) that reads the phase angle of the chopped input voltage and adapts the DC converter to reduce the power delivered to LEDs 110, which results in perceivable dimming. Unfortunately, this means the dimming range for LED light bulb 102 is dependent upon the dynamic range of LED controller 106 and not dimmer 104. While dimming LED light bulbs, it is not uncommon to reduce the power applied to the LED light bulbs by 99% or more in order to achieve a comparable dimming effect that one would experience when dimming incandescent light bulbs. That means for a 9-watt LED light bulb, when fully dimmed, the power provided by a dimmer (e.g., dimmer 104) could be well below 1 watt.

As a user continues to reduce power provided to LED light bulb 102 via dimmer 104, the current flow through TRIAC 120 will fall accordingly. At some point, the current may fall below the TRIAC's holding current, or there will not be enough current to latch TRIAC 120 on when current is injected into the gate as DIAC 116 pulses. When this occurs, TRIAC 120 may suddenly turn off or not trigger at all, and the power delivered to LED light bulb 102 is interrupted. For the next few cycles, the input current to TRIAC 120 might be higher, which allows converter 106 to restart and power up LEDs 110. This condition creates "flickering" or an instability that results in a rapid turn on and turn off of LEDs 110.

Flickering can be reduced or eliminated by maintaining the current flow above a minimum when TRIAC 120 is triggered by a pulse from DIAC 116. Current in the TRIAC can be maintained above the minimum if a load such as a resistor is permanently coupled between the outputs of dimmer 104 and thus in parallel with light bulb 102. However, this solution leads to low efficiency due to the power loses in the permanently coupled resistor, particularly when full power is being delivered to light bulb 102.

Figure 3:
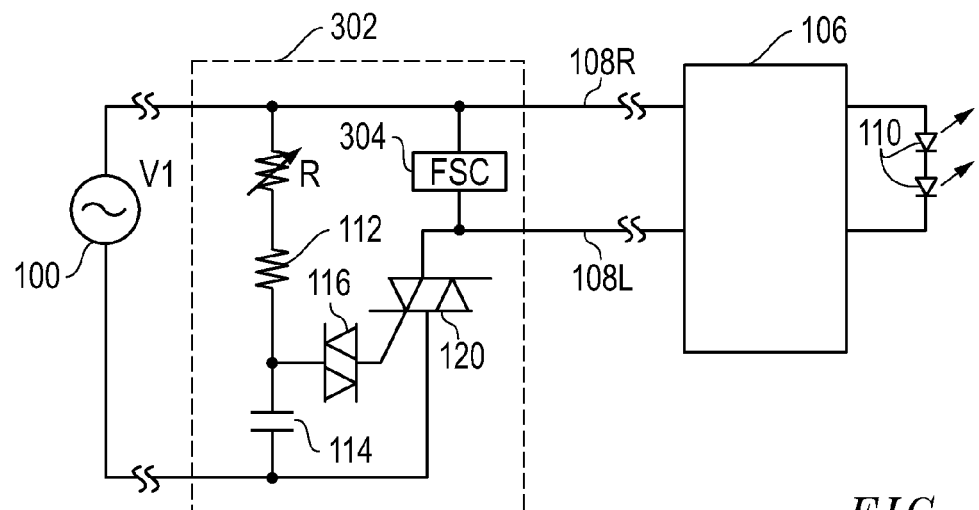
FIG. 3 is a schematic and block diagram illustrating a lighting system employing a flicker suppression circuit.
Figure 4:
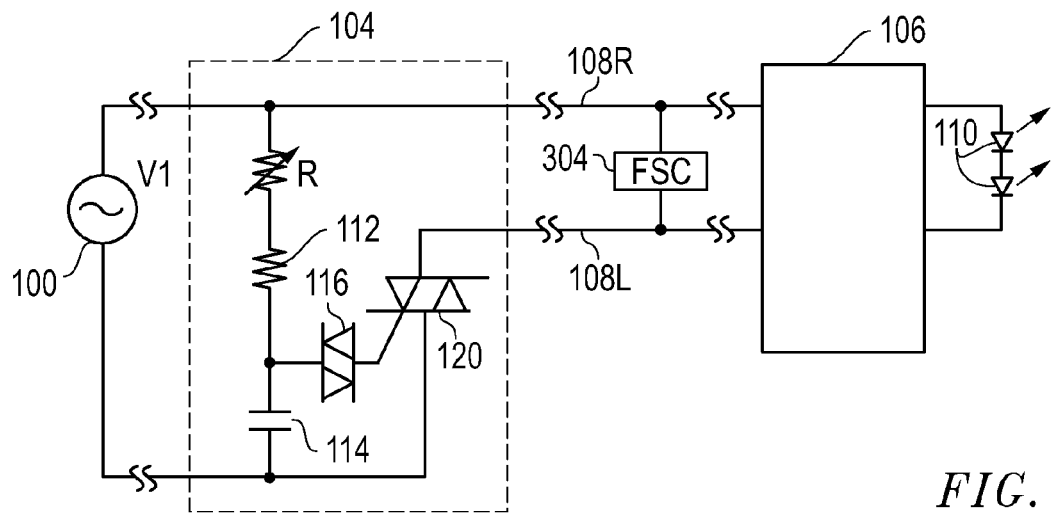
FIG. 4 is a schematic and block diagram illustrating a lighting system employing a flicker suppression circuit.
Figure 5:
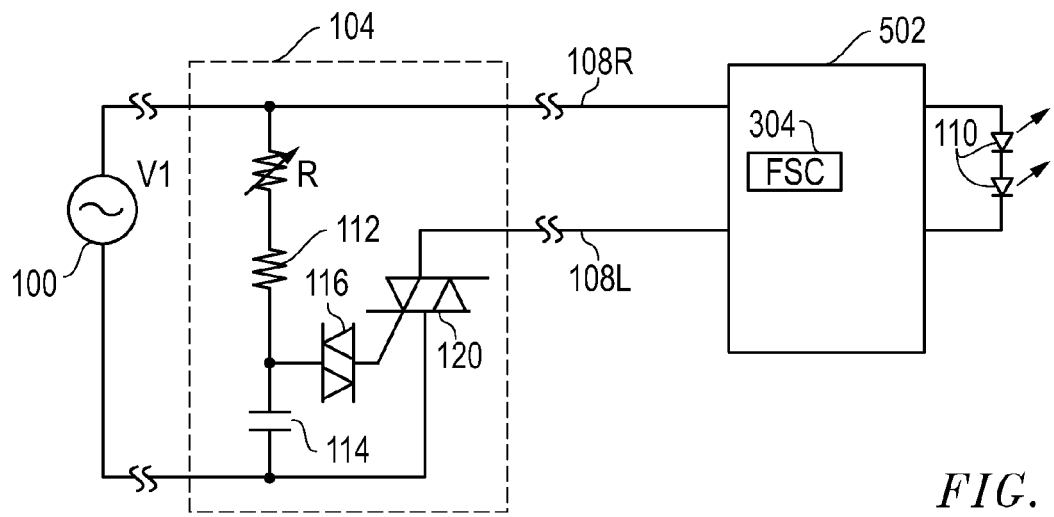
FIG. 5 is a schematic and block diagram illustrating a lighting system employing a flicker suppression circuit.

Alternatively, a load such as a resistor can be selectively coupled in parallel with light bulb 102 when needed. FIGS. 3-5 illustrate alternative solutions in which a flicker suppressor circuit selectively couples a load such as a resistor in parallel with light bulb 102. The selectively coupled resistor can operate to maintain a minimum TRIAC current when needed, which should reduce or eliminate flickering.

FIGS. 3-5 illustrate lighting systems each of which contain a flicker suppressor circuit (FSC). In one embodiment, the FSC circuits in each of the Figures are identical to each other. In an alternative embodiment the FSC circuits may be different from each other. In FIG. 3, the FSC is contained within dimmer 302, and in FIG. 4, the FSC is between dimmer 104 and light bulb 102. It is noted that dimmer 302 shown in FIG. 3 is nearly identical to dimmer 104 shown in FIG. 1, except for the addition of FSC 304. In FIG. 5, LED converter circuit 502 may be similar to the LED converter 106 circuit shown in FIG. 3 or 4, except for the addition of FSC 304. In one embodiment, the FSC 304 in LED converter circuit 502 may be identical to FSCs 304 shown within FIGS. 3 and 4. In an alternative embodiment, the FSC 304 in FIG. 5 may be different. For example, the FSC 304 in FIG. 5 may share a bridge rectifier (more fully described below) with other components of LED convertor circuit 502.

The FSC 304 can maintain a minimum current in TRIAC 120 by inserting a bleeder resistor (not shown in FIGS. 3-5) in parallel with LED light bulb 106 when needed. When not needed, the FSC disconnects the bleeder resistor so that current does not flow there through. In one embodiment, the FSC can maintain current in TRIAC 120 by inserting the bleeder resistor just before TRIAC 120 is activated by a pulse from DIAC 116. The FSC can maintain the bleeder resistor in parallel with light bulb 102 for a short time after the DIAC pulse ends to insure that TRIAC latching current is meet. The bleeder resistor should be sized so that a minimum current (e.g., current that is greater than the latching or holding current for TRIAC 120) flows through it. This will insure proper latching of TRIAC 120 for the remaining portion of the voltage cycle and maintain the power provided to the LED light bulb 106, which in turn should preclude flickering. In one embodiment, the FSC is a stand-alone system, which means that it operates independently of LED converter 106 shown in FIG. 3 or 4 or the other electronics contained in LED converter 502. In other words, FSC does not rely on a control signal from of LED converter 106 shown in FIG. 3 or 4 or the other electronics contained in LED converter 502 when selectively inserting a bleeder resistor in between the outputs of dimmer 104 or 302.

Figure 6:
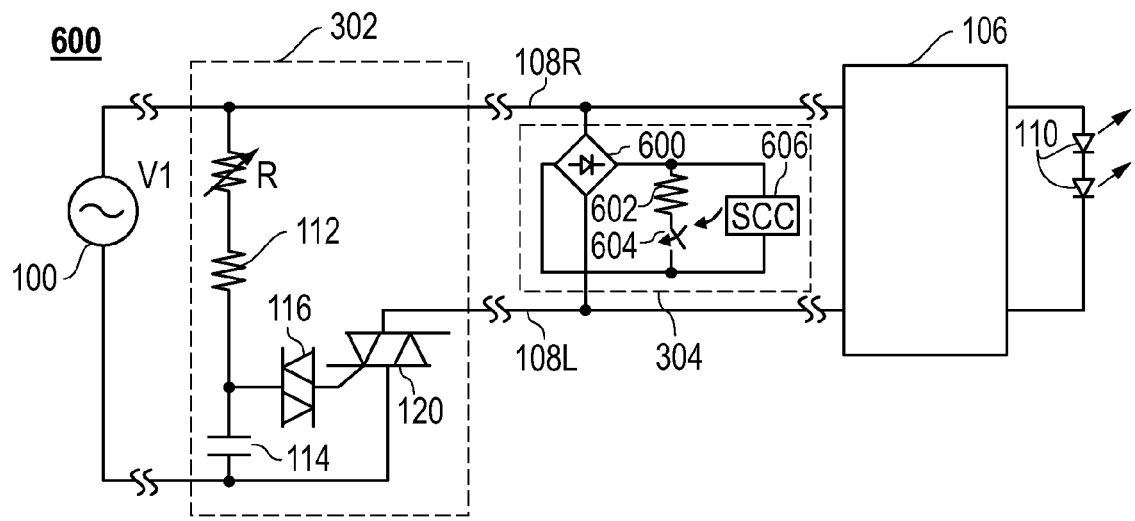
FIG. 6 shows the lighting system of FIG. 4 with a more detailed view of an example flicker suppression circuit.

FIG. 6 illustrates an example FSC that can be employed within any of the lighting systems shown in FIGS. 3-5. More particularly, the FSC includes a bridge rectifier circuit 600. A rectifier is an electrical device that converts alternating current (AC), which periodically reverses direction, to direct current (DC), which flows in only one direction. The process is known as rectification. Inputs to bridge rectifier 600 are coupled to conductors 108R and 108L as shown. The FSC further includes a bleeder resistor 602 and switch 604. Lastly, the FSC includes a switch control circuit 606 that controls switch 604.

In one embodiment, the switch control circuit 606 closes switch 604 just before a gate pulse is provided to TRIAC 120 via DIAC 116. The switch control circuit 606 continues to maintain switch 604 in the closed position for a short time period after the gate pulse completes. While switch 604 is closed the minimal current needed to turn on or maintain TRIAC 120 in the on state can flow through bleeder resistor 602. Once TRIAC 120 turns on, switch control circuit 606 opens switch 604.

Figure 7:
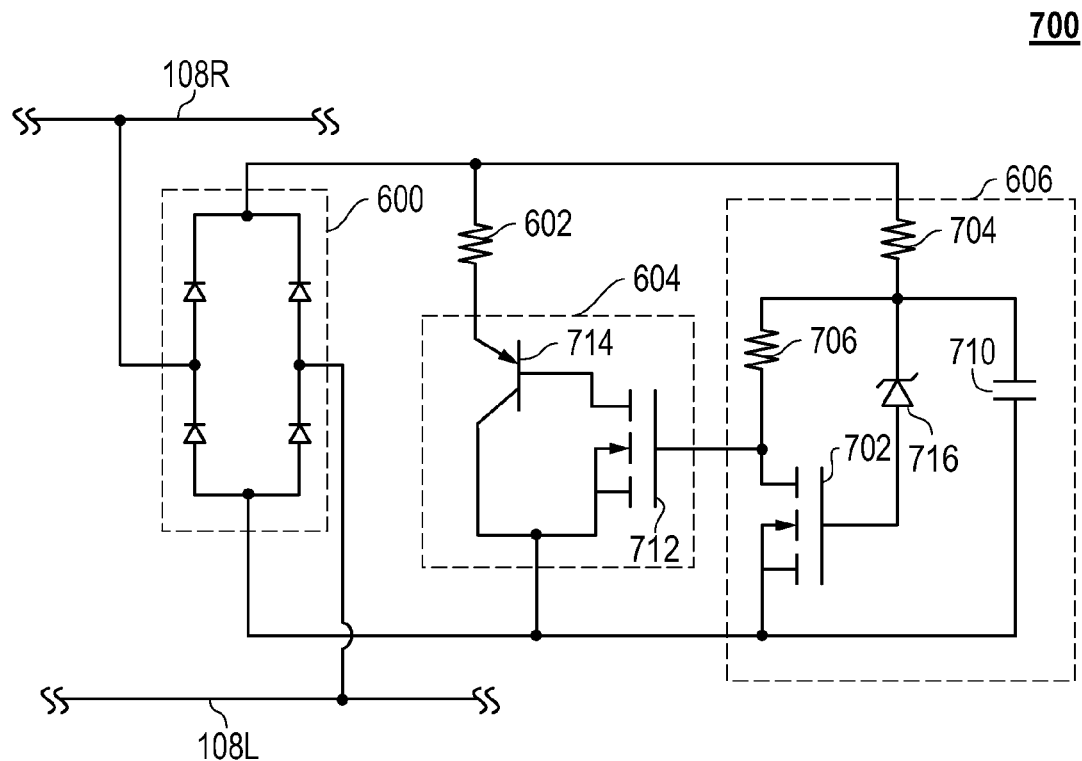
FIG. 7 is a schematic diagram illustrating an example of the flicker suppression circuit shown in FIG. 6.

FIG. 7 illustrates in an example embodiment of the FSC shown in FIG. 6. Rectifier 600 contains diodes arranged in a bridge to convert the AC input to DC output, which is provided to the series combination of bleeder resistor 602 and switch 604. In one embodiment, switch 604 takes form in an integrated gate bipolar transistor (IGBT). The IGBT combines a FET 712 for the control input, and a bipolar power transistor 714 for the switching mechanism. The switch control circuit 606 takes form in MOSFET 702 having a drain coupled to a gate of FET 712. The switch control circuit 606 includes a pair of resistors 704 and 706, and a capacitor 710. Lastly, capacitor 710 is coupled in parallel with a zener diode 716 and MOSFET 702 as shown. Zener diode 716 is coupled between the gate of MOSFET 702 and common node c. A zener diode is a special kind of diode which allows current or flow in the forward direction in the same manner as an ideal diode, but will also permit it to flow in the reverse direction when the voltage is above a certain value known as the zener breakdown voltage.

Bleeder resistor 602 is inserted in parallel with the LED light bulb 102 when switch 604 is activated or turned on. Switch 604 is controlled by MOSFET 702, which in turn is controlled by the voltage at common node c. To illustrate, assume MOSFET 702 is off or inactive (e.g., the gate to source voltage Vgs of MOSFET 702 is below its threshold voltage Vt). With MOSFET 702 off, switch 704 is closed, which couples bleeder resistor 602 in parallel with light bulb 106 via bridge 600. Also, assume TRIAC 120 is initially inactive or turned off, and as a result no current flows therethrough or through bleeder resistor 602. On the other hand, because switch 604 is closed prior to activation of TRIAC 120, TRIAC 120 can draw current through bleeder resistor 602 when TRIAC 120 is first activated.

As line voltage V1 increases, capacitor 114 integrates charge, which in turn increases the voltage across DIAC 116. Eventually, this voltage exceeds the DIAC breakover voltage, at which point DIAC 116 conducts current to the gate of TRIAC 120 during the pulse as described above. With the pulse, current begins flowing through bleeder resistor 602 and TRIAC 120. Bleeder resistor 602 should be sized so that the current flowing TRIAC 120 exceeds a latching current when the DIAC pulse ends.

The voltage at common node c within switch circuit 606 continues to increase. More particularly, as current flows through resistor 704 and into capacitor 710, the voltage on capacitor 710 increases. Eventually, as the voltage at common node c exceeds the zener breakdown voltage of zener diode 716, the voltage at the gate of MOSFET 702 increases. Once the gate voltage of MOSFET 702 exceeds its threshold voltage Vt, MOSFET 702 activates, which in turn deactivates switch 604 by virtue of deactivating FET 712. With switch 604 off, current no longer flows through bleeder resistor 602. However, at that point, current flow through TRIAC 120 should exceed its latching current, and TRIAC 120 turns on.

It is noted that current can flow through resistors 704 and 706 within switch control circuit 606 when MOSFET 702 is turned on. However, if resistor 704 is sufficiently sized (e.g., 560 k ohms) relative to resistor 706, the power consumed by the combination of resistors 704 and 706 should be minimal. It is also noted that capacitor 710 is provided to increase the speed at which MOSFET 702 will activate by virtue of current flow from capacitor 710 to the gate of MOSFET 702 via zener 716, since resistor 704, which has a high resistance, restricts the flow of current to common node c, and thus to the gate of MOSFET 702 via zener diode 716.

As the line voltage V1 begins to drop toward the zero crossing and begin the next half-phase cycle, the voltage at the common node c also begins to drop. When the voltage at node c falls below the zener breakdown voltage of zener diode 716, MOSFET 702 will deactivate once its gate voltage drops below Vt. When MOSFET 702 deactivates, the voltage at the gate of FET 712 raises and eventually activates FET 712, which in turn closes switch 604 and places bleeder resistor 602 in parallel with the light bulb 106 once again. It is noted that current may flow through bleeder resistor 602 before line voltage V1 reaches the zero crossing. However, since line voltage V1 is reducing toward zero, this current flow through bleed resistor 602 is small, which in turn minimizes the power consumption of bleeder resistor 602 prior to the zero crossing. Further, as the line voltage V1 reduces toward zero, eventually the current flow through TRIAC 120 falls below its holding current and TRIAC 120 will turn off as a result. Once turned off, current will no longer flow through bleeder resistor 602. However, switch 604 remains on by virtue of the voltage remaining across capacitor 710. The time during which switch 604 is closed thus inserting bleeder resistor 602 in parallel with light bulb 106 can be controlled by the size of resistor 706. As the resistance of resistor 706 increases, the time during which switch 604 remains closed increases, and vice versa.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

I claim:

1. An apparatus comprising:
   a rectifier circuit comprising input terminals and output terminals, wherein the rectifier circuit is configured to rectify a line voltage to generate a rectified voltage at the output terminals;
   a resistor and switch coupled in series;
   a switch control circuit directly coupled between the output terminals and configured to control the switch only as a function of the rectified voltage;
   first and second nodes;
   a variable resistor coupled to the first node;
   a capacitor coupled to the variable resistor;
   a diode for alternating current (DIAC) coupled to the variable resistor and the capacitor;
   a triode for alternating current (TRIAC) comprising a base and terminals, wherein a first of TRIAC terminals is coupled to one of the input terminals of the rectifier circuit, wherein a second of the TRIAC terminals is coupled to the second node, and wherein the base is coupled to the DIAC.

2. The apparatus of claim 1 further comprising a light emitting diode (LED) circuit coupled between the input terminals of the rectifier circuit and to the first node, wherein the LED circuit comprises an LED.

3. The apparatus of claim 2 wherein the LED circuit further comprises a converter circuit for converting the line voltage into a constant voltage, and wherein the switch control circuit is configured to control the switch independent of the converter circuit.

4. The apparatus of claim 1 further comprising an LED light bulb, wherein the switch control circuit is configured to control the switch independent of the LED light bulb.

5. An apparatus comprising:
a rectifier circuit comprising input terminals and output terminals, wherein the rectifier circuit is configured to rectify a line voltage to generate a rectified voltage at the output terminals;
a resistor and switch coupled in series;
a switch control circuit directly coupled between the output terminals and configured to control the switch only as a function of the rectified voltage;
wherein the switch control circuit comprises a MOSFET comprising a source coupled to one of the output terminals, a second resistor coupled to a drain of the MOSFET, and a zener diode coupled to a gate of the MOSFET, wherein a voltage at the drain controls the switch.

6. The apparatus of claim 5 further comprising a third resistor coupled to the other of the output terminals and a common node, wherein the second resistor is coupled to the common node, the zener diode is coupled to the common node, and the capacitor is coupled to the common node.

7. The apparatus of claim 1 wherein the switch comprises an IGBT.

8. A method comprising:
closing a switch to couple a resistor in parallel with an LED light bulb and a switch control circuit;
a TRIAC receiving gate current after the switch is closed, wherein the TRIAC is coupled in series with the parallel combination of the LED light bulb, the switch control circuit and the resistor;
the resistor transmitting current in response to the TRIAC receiving gate current;
after the resistor transmit current, opening the switch when a voltage at a node within the control circuit rises to a first voltage level;
after opening the switch, closing the switch again when the voltage at the node lowers to a second voltage level.

9. The method of claim 8 further comprising:
a capacitor coupled to the node and accumulating charge in response to the TRIAC receiving gate current;
a zener diode transmitting current from the capacitor to a gate of a MOSFET when the voltage at the node reaches the first voltage;
the MOSFET activating in response to receiving current at the gate;
wherein the switch closes in response to the MOSFET activation.

10. The method of claim 9 further comprising:
the MOSFET deactivating in response to the voltage at the node lowering to the second voltage;
wherein the switch opens in response to the MOSFET deactivation.

11. The method of claim 8 wherein the switch opens when current flow through the TRIAC exceeds a latching current of the TRIAC.

12. A method comprising:
closing a switch to couple a resistor in parallel with an LED light bulb;
a TRIAC receiving gate current after the switch is closed, wherein the TRIAC is coupled in series with the parallel combination of the LED light bulb and the resistor;
the resistor transmitting current in response to the TRIAC receiving gate current;
after the resistor transmit current, opening the switch so that the resistor does not transmit current;
wherein the switch is opened and closed independent of operation of the LED light bulb.

13. The method of claim 12 wherein the switch opens after current flow through the TRIAC exceeds a latching current for the TRIAC.

* * * * *